UNITED STATES PATENT OFFICE.

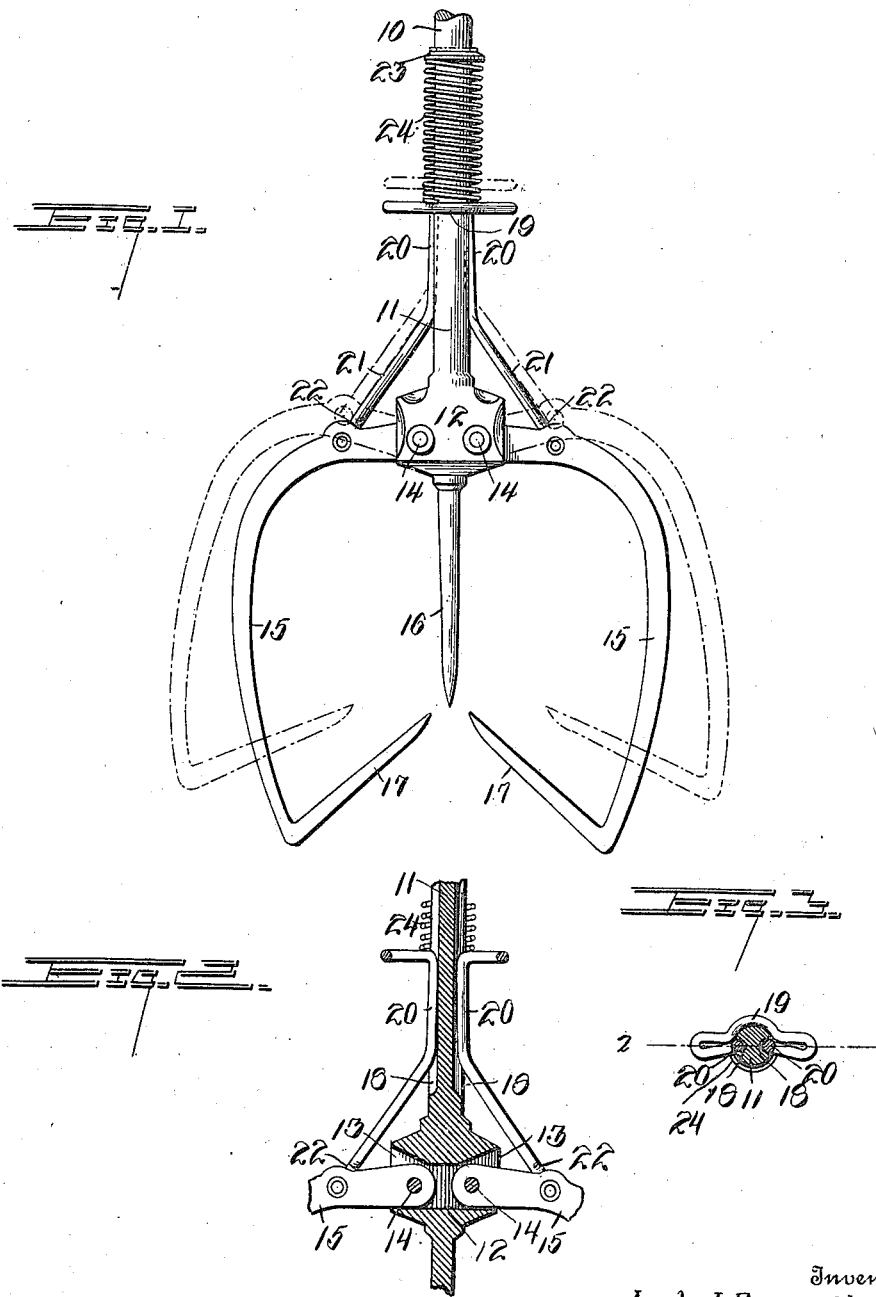

JACOB J. BJORNSETH, OF ACKWORTH, NORTH DAKOTA.

FISH-SPEAR.

964,375.  Specification of Letters Patent.  Patented July 12, 1910.

Application filed December 28, 1909. Serial No. 535,293.

*To all whom it may concern:*

Be it known that I, JACOB J. BJORNSETH, a citizen of the United States, residing at Ackworth, in the county of Rolette, State of North Dakota, have invented certain new and useful Improvements in Fish-Spears; and I do hereby declare the following to be a full, clear, and exact description of the invention, such as will enable others skilled in the art to which it appertains to make and use the same.

This invention relates to fish spears and its object is to provide an improved form of fish spear wherein the fish may be caught securely and yet may be removed without tearing the fish as is common with the ordinary barbed grains usually used.

Another object of the invention is to provide an improved form of fish spear wherein the fish will be impaled on a central point and held by lateral points, the last mentioned points serving to guide the fish on to the central point.

With the above and other objects in view, the invention consists of a shank provided at its lower end with a central point and having certain lateral members arranged to guide a fish on to said central point and hold the same securely in position when so impaled.

The invention further consists in certain novel details of construction and combinations of parts hereinafter fully described, illustrated in the accompanying drawings, and specifically set forth in the claim.

In the accompanying drawings, like characters of reference indicate like parts in the several views, and:—Figure 1 is a side view of the lower end of a fish spear constructed in accordance with this invention. Fig. 2 is a section on the line 2—2 of Fig. 3. Fig. 3 is a transverse section through the lower part of the handle.

The numeral 10 indicates the haft or handle of the spear and at 11 is the usual shank. This shank is provided at its lower end with a broadened head 12 having an opening 13 extending therethrough. This head is also provided with oppositely disposed pin receiving openings wherein are held pivot pins 14. On these pivot pins 14 are mounted the upper ends of curved arms 15, the arms extending outward and being curved in a downward direction as clearly seen in Fig. 1. Extending downward from the head 12 is a point 16 and extending upward and inward from each of the arms 15 is a point 17, the three points terminating in close proximity when the device is closed.

From an inspection of Fig. 1 it will be seen that as the spear is thrust at a fish the sides of the points 17 strike the fish and it is guided up to the extremity of one or the other of these points. The points 17, when the fish has arrived at their proximal ends, spread apart and permit the point 16 to enter the body of the fish. It is obvious that these points will then remain apart and in order to bring them together and hold the fish on the point 16 the shank 11 is provided with oppositely disposed grooves 18. At 19 is indicated the bight of a wire which surrounds one-half of the shank. The wire then extends from both ends of the bight outwardly and is rebent inwardly and then bent downwardly on both sides of the shank so that the downwardly bent portions lie in the grooves 19. These downwardly bent portions are indicated by the numeral 20 and from the lower ends of this portion of the wire both ends of the wire flare outward as at 21 and terminate in hooks 22 which are received in suitable openings made in the arms 15. In order to force the slider formed by this wire downward there is provided on the shank a collar 23 and between the collar 23 and the slider just mentioned is a coil spring 24.

In using this spear, after the fish has been caught upon the central point and removed from the water, the outwardly extending portions of the slider are grasped by the fingers of one hand and the shank in the other hand. The slider is then pulled up along the shank with the result that the arms 15 separate as shown in dotted lines in Fig. 1 and the fish may be readily removed from the smooth and unbarbed point 16 without any other injury than that caused by the penetration of this point. In this manner the fish is not spoiled for the market or table and in addition, it will be observed that the device is especially adapted to catching such slippery fish as eels as in each instance they are positively guided on to the central point 16 by the points 17.

There has thus been provided a simple and efficient device of the kind described and for the purpose specified.

Having thus described the invention, what is claimed as new, is:—

In a fish spear, a shank having oppositely disposed longitudinal grooves, a head on said shank provided with an opening therethrough, a point projecting downward from the head, arms pivoted in the opening and extending outwardly and downwardly from the head, each of said arms being provided with an upwardly and inwardly extending point, a slider on said shank and connected to said arms, said slider being provided with longitudinal portions fitting in and guided by said grooves, and a spring on the shank normally pressing the slider downward and forcing the points on the arms into proximity with the first mentioned point.

In testimony whereof, I affix my signature, in presence of two witnesses.

JACOB J. BJORNSETH.

Witnesses:
C. I. F. WAGNER,
A. V. WAGNER.